US005976677A

United States Patent [19]

Umeda et al.

[11] Patent Number: 5,976,677

[45] Date of Patent: Nov. 2, 1999

[54] SURFACE COATING AND METHOD OF APPLYING THE SAME

[75] Inventors: Hironori Umeda, Iwakuni; Tohru Mashimo, Higashihiroshima; Kazuo Hironaka, Hatsukaichi; Tadamitsu Nakahama; Takakazu Yamane, both of Hiroshima; Makoto Aizawa; Yukifumi Taniguchi, both of Hiroshima-ken, all of Japan

[73] Assignee: Mazda Motor Corporation, Hiroshima, Japan

[21] Appl. No.: 08/998,783

[22] Filed: Dec. 29, 1997

Related U.S. Application Data

[63] Continuation of application No. 08/432,496, May 1, 1995, abandoned, which is a continuation of application No. 08/083,771, Jun. 3, 1993, abandoned.

[30] Foreign Application Priority Data

| | | | |
|---|---|---|---|
| Apr. 6, 1992 | [JP] | Japan | 4-200167 |
| Jun. 30, 1992 | [JP] | Japan | 4-194703 |
| Jul. 21, 1992 | [JP] | Japan | 4-214785 |

[51] Int. Cl.[6] .................. B32B 5/00

[52] U.S. Cl. .................. 428/207; 428/203; 428/204; 428/205; 428/206; 428/208

[58] Field of Search .................. 427/157, 214, 427/218, 221, 409, 412.1, 412.3, 412.4, 412.5; 428/141, 142, 201, 203, 204, 205, 206, 207, 323, 327, 328, 329, 423.1, 423.7, 480, 208

[56] References Cited

U.S. PATENT DOCUMENTS

| | | | |
|---|---|---|---|
| 5,108,796 | 4/1992 | Yamanaka et al. | 427/379 |

FOREIGN PATENT DOCUMENTS

| | | |
|---|---|---|
| 58-202080 | 11/1983 | Japan . |
| 59-4471 | 1/1984 | Japan . |
| 61-238366 | 10/1986 | Japan . |
| 62-79874 | 4/1987 | Japan . |
| 1-108726 | 7/1989 | Japan . |
| 2-68169 | 3/1990 | Japan . |
| 3-157167 | 7/1991 | Japan . |

*Primary Examiner*—D. S. Nakarani
*Attorney, Agent, or Firm*—Martin Fleit

[57] ABSTRACT

A surface coating applied to a subject surface includes an undercoating, a color base layer, coated over the undercoating layer, which contains a coloring material, and a color clear layer, coated over the color base layer, which contains a coloring dye of a hue within +/−10 from a hue of the coloring material of the base color layer on the 100-division Mansell hue ring.

11 Claims, 7 Drawing Sheets

SURFACE COATING AND METHOD OF APPLYING THE SAME

This application is a continuation of application Ser. No. 08/432,496, filed May 1, 1995, now abandoned, which is a continuation of application Ser. No. 08/083,771, filed Jun. 30, 1993, now abandoned.

BACKGROUND OF THE INVENTION

1. Field of the Invention

This invention relates to a layer structure of surface coating applied, for instance, to vehicle bodies, which provides a feeling of transparency and depth, to a method for applying same and to a novel laminate and novel vehicle body.

2. Description of Related Art

Surface coatings applied to vehicle bodies are intended essentially to protect a vehicle body surface against scratches and improve the durability of it. In recent years, in addition to this purpose, such a surface coating is also intended to meet a call for a high quality of external appearance of a coated vehicle body which provides an impulse to users' sensitivity. In order to improve coating quality, it is indispensable to intensify a feeling of the depth of coating and a feeling of the transparency of coating, and to use pure coating colors of low lightness and high chroma.

Another strong tendency or requirement is directed to coal-black surface coating which can offer a feeling of luxury appearance and a feeling of depth. However, conventional surface coatings are rendered difficult to offer these feelings, which are attributable to scattering of light caused by various elements, such as an outer surface of the surface coating, pigments and/or dyes contained in the coating layers, and the layers themselves. This is because, scattering of light makes it difficult to decline sufficiently the lightness of color which is one of the barometers or indices of black.

Conventionally, in order to improve feelings of coating quality and luxury appearance of a surface coating, of which a color clear layer, as a white/black shielding layer, has a thickness greater than approximately 100 μm, is coated over a color base layer, there have been proposed various surface coating structures. One surface coating structure uses such a coloring material or agent of the color clear layer that it has a hue within +/−10 divisions from the contrast point in the 100-division Mansell hue ring to a hue of a coloring material or agent, such as a pigment, of the color base layer. Such a surface coating structure is known from, for instance, Japanese Unexamined Patent Publication No.3-157167. Another surface coating structure has a color base layer containing a coloring material or agent such as a pigment, whose color is relatively dark or deep, and a color clear layer containing a coloring material or agent such as a pigment of a high chroma of color similar to or the same as the color of the color base coloring agent or material, as described in Japanese Unexamined Patent Publication No.61-238366. Further, Japanese Unexamined Utility Model Publication No.1-108726 reveals a surface coating structure with a transparent clear layer which contains a dye as a coloring material and is applied over a color clear layer coated on a color base layer by what is called a "wet-on-wet coating". Otherwise, in order to enhance a feeling of depth of a surface coating, a brilliant material, such as powdered aluminum, may be contained in the color clear layer as described in Japanese Unexamined Patent Publication No.62-79874. Further, a plurality of different color of color clear layers may be applied one after another as described in Japanese Unexamined Patent Publication No. 58-202080.

Another approach to high quality of surface coatings is to improve coating techniques which can provide a precise control of thickness and uniformity in thickness of coating layers.

In conventional ways of surface coatings described in, for instance, Japanese Unexamined Patent Publication Nos.59-4471 and 2-68169, while a subject surface is horizontally moving, a pair of spray devices or guns disposed above and laterally aside the course of movement of the subject surface, which are reciprocally movable approximately in directions perpendicular to the moving direction of the subject surface, spray paints onto the subject surface. Such a surface coating manner is essential to move the spray guns so as to overlap partly their painting patterns. Consequently, a surface coating can not be made uniform in thickness between overlapped part and non-overlapped part. In addition, because of the zig-zag tracks of painting at small pitches by the spray guns, it is difficult to form a uniform thickness of surface coating.

Particularly, as to a surface coating having a color clear layer which contains a coloring dye whose transparency is generally high as compared with those of pigments and allows vivid or clear color to come out well on the clear layer, the surface coating is greatly influenced on coloring by its thickness. Consequently, unevenness in the thickness of a surface coating induces lacking in color uniformity of the surface coating. Further, because after light transmits a color clear layer to a color base layer, it is reflected by the color base layer and transmits the color clear layer, with an increase in lightness of the color base layer, lack in color uniformity of the surface coating becomes a significant problem. Accordingly, a larqe unevenness in thickness of the surface coating, such as 10 μm of unevenness in thickness, allows only colors, almost near black, to be available to surface coatings.

SUMMARY OF THE INVENTION

It is therefore an object of the present invention to provide a surface coating structure which can realize a surface coating with a pure color of low lightness and high chroma and thereby intensify a feeling of the depth of surface coating and a feeling of the clearness of surface coating.

It is another object of the present invention to provide a surface coating structure which can realize a coal-black surface coating which provides a feeling of luxury appearance and a feeling of the deepness of surface coating.

It is another object of the present invention to provide a surface coating method which can provides a fine control of thickness of a surface coating so as to make the surface coating uniform in thickness, thereby eliminating an occurrence of lack in color uniformity of the surface coating.

The above objects of the present invention are achieved by providing a surface coating applied to a subject surface which comprises an undercoating coated on the subject surface, a color base layer coated over the undercoating, and a color clear layer coated over the color base layer. The color base layer contains a coloring material, such as a pigment, and has a surface roughness of less than approximately +/−2 μm. The color clear layer coated contains a coloring dye having a hue within +/−10 divisions from a hue of a coloring material of the base color layer on the 100-division Mansell hue ring and has an internal reflectance of less than 0.1% when letting a reflectance of a barium sulphate plate be 100%. The surface coating having such a coating structure causes a decrease in scattering and provides a purely colored appearance with low lightness and high chroma.

Specifically, the coloring dye of the clear layer is distributed so as to decline in concentration gradually from a top surface to a bottom of the color clear layer. This gradient or gradual decline in concentration of coloring dye causes a decrease in scattering and enhances a feeling of depth of the surface coating. Further, the color clear layer may contain a brilliant material distributed in the crust or close vicinity of the top surface thereof, which increases the difference in intensity between reflected light by the brilliant material and the interface between the color base and color clear layers. This difference causes an increase in feeling of depth of the surface coating. A combination of a coloring dye and a brilliant material may be used so as to cause a further increase in feeling of depth of the surface coating. In this instance, the coloring dye is distributed so as to increase in concentration gradually from a top surface to a bottom of the color clear layer, along with distributing a brilliant material in the crust or close vicinity of the top surface of the color clear layer.

The color clear layer may be comprised of at least two constituent layers, each of which contains a coloring dye of a hue within +/−10 divisions from a base color hue on the 100-division Mansell hue ring. At least one of the constituent layers contains a coloring dye of a hue within +10 divisions from the hue of the coloring material of the base color layer on the 100-division Mansell hue ring, and at least another one of the constituent layers contains a coloring dye of a hue within −10 divisions from the hue of the coloring material of the base color layer on the 100-division Mansell hue ring. This structure of the color clear layer lets the surface coating to provides a pure color appearance.

For a black surface coating which is comprised of an undercoating coated on a subject surface, a black layer coated over the undercoating, and a color clear layer coated over the color base layer, the color clear layer contains 0.1 to 10 weight % of a black dye. This black base layer is preferred to have a lightness of less than 0.2. Such a black surface coating, which causes a decline in scattering of light by a surface of the surface coating, the black dye, and the coating resin itself, offers an enhanced feeling of depth and an enhanced feeling of coal-black.

When applying the surface coating, in particular, spraying the color clear layer on the color base layer, a paint is sprayed so that a generally circular pattern of sprayed paint continuously moves in a spiral or helical path relative to and around a subject surface at regular pitches while keeping the ratio (d/D) of the regular pitch (d) to the diameter of a sprayed paint pattern (D) unchanged. This ratio is preferred to be less than 0.3. This coating method provides a reduction in controllable thickness of a coating layer and consequently, enables to apply an uniform thickness of even a thick surface coating to a subject surface, so as to avoid the lacking in uniformity of color over the subject surface.

BRIEF DESCRIPTION OF THE DRAWINGS

The above and other objects and features of the present invention will be fully and clearly understood from the following detailed description with respect to a preferred embodiment thereof when considered in conjunction with the accompanying drawings, wherein the same reference numerals have been used to denoted the same or similar elements or parts throughout the drawings, and in which.

DETAILED DESCRIPTION OF THE PREFERRED EMBODIMENT

Figure 1:
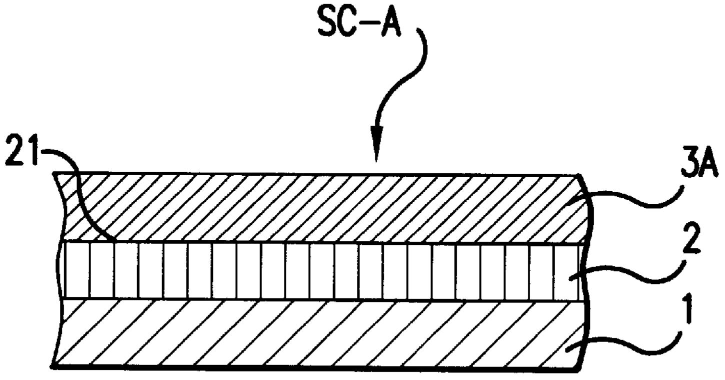
FIG. 1 is a cross-sectional view of a colored surface coating in accordance with a preferred embodiment of the present invention.

Referring to the drawings in detail, and in particular, to FIG. 1, a surface coating structure or laminate in accordance with a preferred embodiment of the present invention is shown. The surface coating SC-A is comprised of an undercoating 1, a color base layer 2 and a color clear layer 3A, coated on a subject surface (not shown) in this order. The surface coating SC-A may have an interim coating between the undercoating and the color base layer. The color base layer 2, coated over the undercoating 1, contains a coloring material, such as a pigment, so as to form an opaque layer against visible light. The color clear layer 3A contains a coloring material, such as a dye, so as to form a transparent layer. This color clear layer 3A may be formed with either a single colored layer or otherwise multiple colored layers. The color clear layer 3A is adjusted both in dye concentration and in layer thickness so as to bear a desired transmittance. Practically, the color clear layer 3A is coated on the color base layer 2 and then, is baked so as to form an interface 21 with a surface roughness of less than approximately +/−2 μm. The undercoating 1 is practically preferred to be coated by means of electrodeposition.

The coloring dye of the color clear layer 3A is selected among dies having hues within +/−10 divisions from a hue of the pigment of the color base layer on the 100-division Mansell hue ring and is adjusted to have a reflectance so as to reflex light entering the color clear layer 3A less than 0.1% when letting a reflectance of a barium sulphate plate be 100%.

The surface coating SC-A has the smooth interface 21 between the opaque base color layer 2 and the transmittable color clear layer 3A, so that there is not produced by the interface 21 scattering of light visible outside the surface coating SC-A.

Because the color clear layer 3A is colored with a coloring dye approximate to a coloring pigment of the color base layer 2 and consequently transmits only light having desired wavelengths therethrough by means of selective absorption, and the color base layer 2 selectively absorbs and reflects light, the surface coating SC-A reflects light having a desired relative spectral energy distribution visible through the color clear layer 3A.

Figure 2:
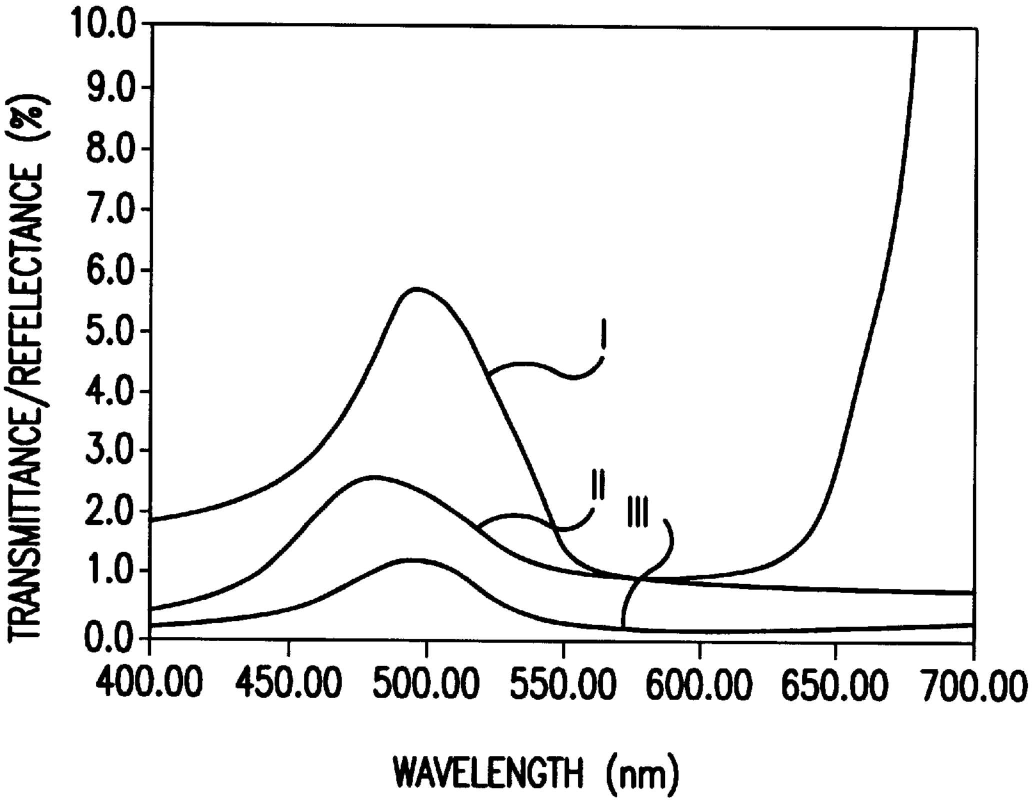
FIG. 2 is a graphical diagram showing spectral transmission factors and spectral reflection factors of structural layers of the surface coating with respect to visible wavelengths.

Referring to FIG. 2, showing a result of measurements, in which curves I and III show spectral reflection factors of the color base layer 2 and the whole surface coating SC-A, respectively, and a curve II shows a spectral transmission factor of the color clear layer 3A, and in which the difference of hue is 3.7 on 100-division Mansell hue ring between the color base layer 2 and the color clear layer 3A, it is apparent that the color clear layer 3A causes a decrease in amount of scattered and reflected light so as to provide a relative spectral energy distribution having a sharp peak. This allows the surface coating SC-A to have a color with a low lightness and a high saturation or chroma.

Example I (FIG. 1)

Blue Surface Coating

Color base layer

Pigment contained paint: OTO 640 (Bey Blue)

Nippon Paint Co., Ltd.

Mancell hue: 6.5PB Paint: Polyester melamine resin paint

| | | |
|---|---|---|
| Paint: | Polyester melamine resin paint | |
| Pigment: | Induntron blue | 65 weight % |
| | Copper Phthalocyanine blue | 30 |
| | Carbon black | 3 |
| | Titanium oxide | 2 |

Color clear layer

Dye contained paint

Dye concentration: 2 weight %; thickness 80 μm

Paint: OTO571-1

Acryl melaminl resin

Dye: ORASOL Blue GN (CIBA GEIGY)

Phthalocyanine (Solvent Blue 67)

Mancell hue: 8.7PB

* Total Mancell hue of color base layer and color clear layer: 2P

Hue difference: 2.2

Coating process

Figure 3:
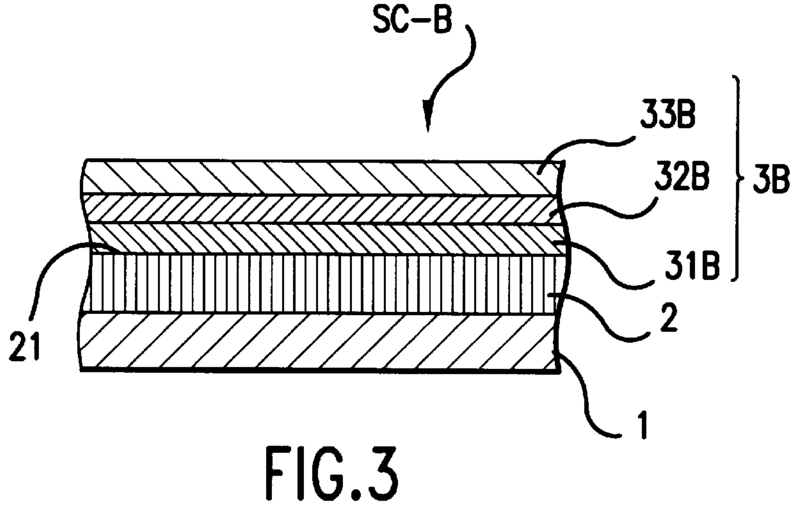
FIG. 3 is a cross-sectional view of a colored surface coating in accordance with another preferred embodiment of the present invention.

1. Apply the color base layer on the vehicle body Layer thickness: 50 μm
2. Bake at 140 degrees C. for 30 minutes
3. Apply the color clear layer Layer thickness: 80 μm
4. Bake at 140 degrees C. for 30 minutes Referring to FIG. 3 illustrating a surface coating SC-B in accordance with another preferred embodiment of the present invention, a color clear layer 3B, coated on a color base layer 2, is comprised of multiple elemental or constituent layers, for example three layers, such as a lower elemental layer 31B, an interim elemental layer 32B and an upper layer 33B. The lower, interim and upper constituent layers 31B, 32B and 33B contain coloring dyes, respectively, whose concentrations are changed from lower to higher in order from the lower constituent layer 31B to the upper constituent layer 33B. That is, the upper constituent layer 33B is the highest in dye concentration among the three, and the lower constituent layer 31B is the lowest in dye concentration among the three. The color clear layer 3B may be comprised of two or more than three constituent layers whose dye concentrations are different from one another. Otherwise, the color clear layer 3B may be comprised of a single constituent layer with a gradation of dye concentration from top to bottom.

The surface coating SC-B absorbs a large amount of light with the upper constituent layer 33B, and provides a decline of scattering and reflection of light within the color clear layer 3B. As a result, the surface coating SC-B enhances a feeling of depth.

Example II (FIG. 3)

Green Surface Coating

Color base layer

Pigment contained paint: OTO 640 (Gren)

Nippon Paint Co., Ltd.

Mancell hue: 9.3BG

| | | |
|---|---|---|
| Paint: | Polyester melamine resin paint | |
| Pigment: | Titanium oxide | 4 weight % |
| | Carbon black | 10 |
| | Copper Phthalocyanin green | 55 |
| | Copper phthalocyanin blue | 27 |
| | Yellow iron oxide | 4 |

Color Clear Layer

Figure 4:
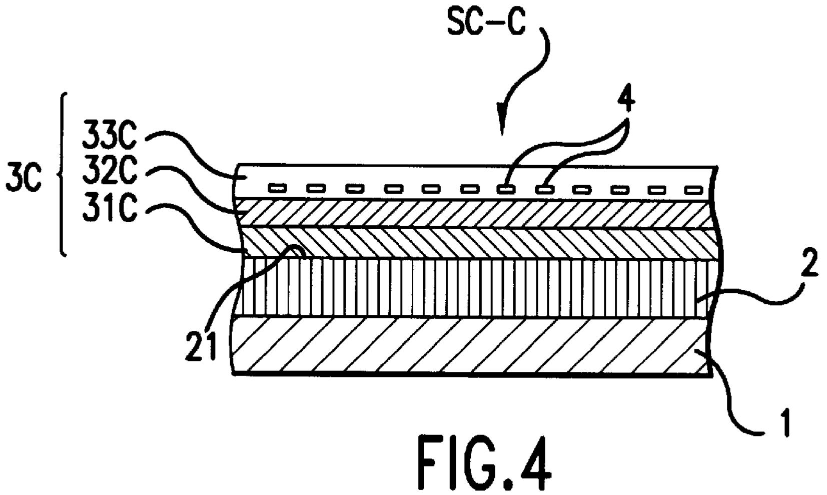
FIG. 4 is a cross-sectional view of a colored surface coating in accordance with still another preferred embodiment of the present invention.

Referring to FIG. 4 illustrating a surface coating SC-C in accordance with another preferred embodiment of the present invention, a color clear layer 3C, coated over a color base layer 2, is comprised of a lower constituent layer 31C, an interim constituent layer 32C and an upper constituent layer 33C. The upper constituent layer 33C contains brilliant particles 4, such as aluminum and white mica, distributed uniformly. The lower, interim and upper constituent layers 31C, 32C and 33C contain dye materials which are the same in concentration.

The color clear layer 3C may be comprised of two or more than three constituent layers including an uppermost constituent layer with brilliant particles uniformly dispersed therein. Otherwise, the clear color layer 3C may be comprised of a single constituent layer with a dispersion of brilliant particles in the surface stratum thereof.

Because of the dispersion of brilliant particles 4 in the surface stratum of the color clear layer 3C, the surface coating SC-C thus layered described above causes a decline of absorption of light by the color clear layer 3C and a decline of absorption of reflected light by the brilliant particles 4 and consequently, endows an increased intensity of reflected light from the brilliant particles 4. As a result, the difference in the intensity of reflection is increased between the color base layer 2 and the color clear layer 3C, attributable to which the surface coating SC-C provide an enhanced feeling of depth.

In addition to the uniform dispersion of brilliant particles 4 in the upper constituent layer 33C, the lower, interim and upper constituent layers 31C, 32C and 33C may contain coloring dyes, whose concentrations are changed from higher to lower in order from the lower constituent layers 31C to the upper constituent layers 33C. That is, the upper constituent layer 33C is the lowest in dye concentration among the three, and the lower constituent layer 31C is the highest in dye concentration among the three. In place of forming the clear color layer 3C with three constituent layers with different dye concentrations, it may be comprised of a single constituent layer with a gradation of dye concentration changing lower to higher from top to bottom. The number of constituent layers of the clear color layer 3C depends upon spectral characteristics of the surface coating SC-C selected.

With this surface coating SC-C, because the upper constituent layer 33C of the color clear layer 3C is the lowest in dye concentration, the absorption of light entering upon the surface coating SC-C and of reflected light from the brilliant particles in the upper constituent layer 33C is lowered, so as to endow a more increased intensity of reflected light from the brilliant particles. Consequently, the difference in the intensity of reflection is increased between the color base layer 2 and the color clear layer 3C, so as to provide the surface coating SC-C with a more enhanced feeling of depth.

Figure 5:
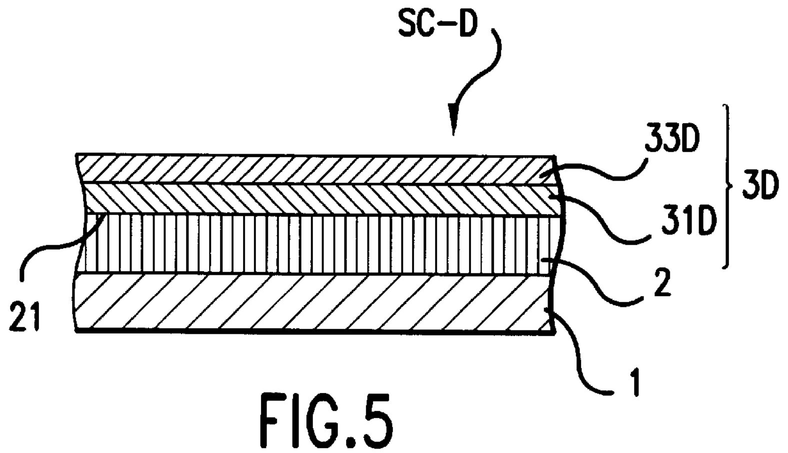
FIG. 5 is a cross-sectional view of a colored surface coating in accordance with a further preferred embodiment of the present invention.

Referring to FIG. 5 illustrating a surface coating SC-D in accordance with still another preferred embodiment of the present invention, a color clear layer 3D, coated over a color base layer 2, comprises a lower constituent layer 31D and an upper constituent layer 33D. A dye contained in each of the lower and upper constituent layers 31D and 33D has a hue within +/−10 from a hue of coloring pigment of the color base layer 2 on the 100-division Mansell hue ring. Specifically, the dye contained in the lower constituent layer 31D has a hue within +10 from the coloring pigment hue of the color base layer 2 on the 100-division Mansell hue ring, and the dye contained in the upper constituent layer 33D has a hue within −10 from the coloring pigment hue of the color base layer 2 on the 100-division Mansell hue ring.

If the color clear layer 3D is comprised of more than three constituent layers, dies contained in all of the three constituent layers have to have hues within +/−10 from a coloring pigment hue of the color base layer 2 on the 100-division Mansell hue ring. Further, at least one of the constituent layers has to contain a dye whose hue is within +10 from the coloring pigment hue of the color base layer 2 on the 100-division Mansell hue ring, and at least one of the constituent layers has to contain a dye whose hue is within −10 from the coloring pigment hue of the color base layer 2 on the 100-division Mansell hue ring.

Figure 6:
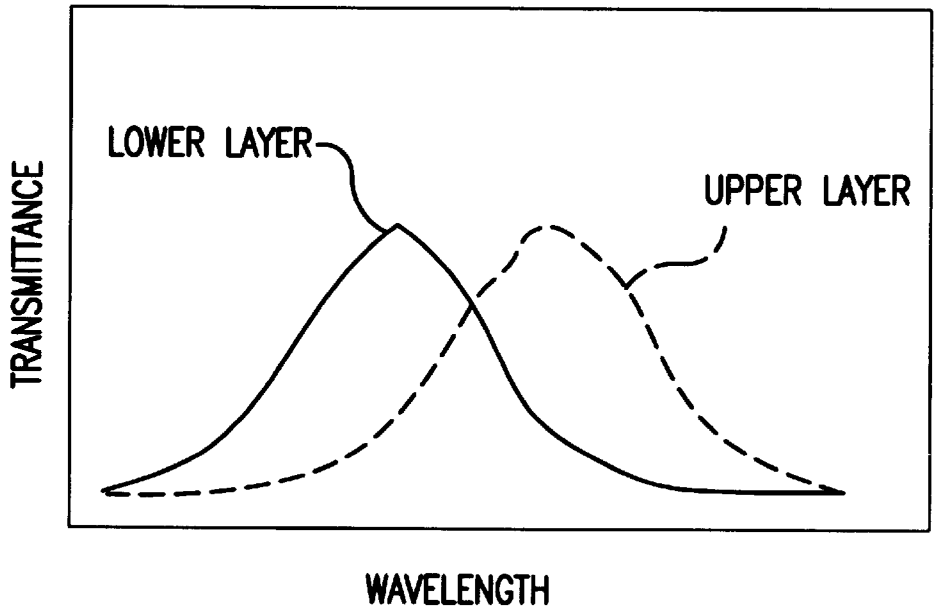
FIG. 6 is a graphical diagram showing spectral transmission factors of first and second elemental color clear layers of the surface coating of FIG. 5 with respect to visible wavelengths.
Figure 7:
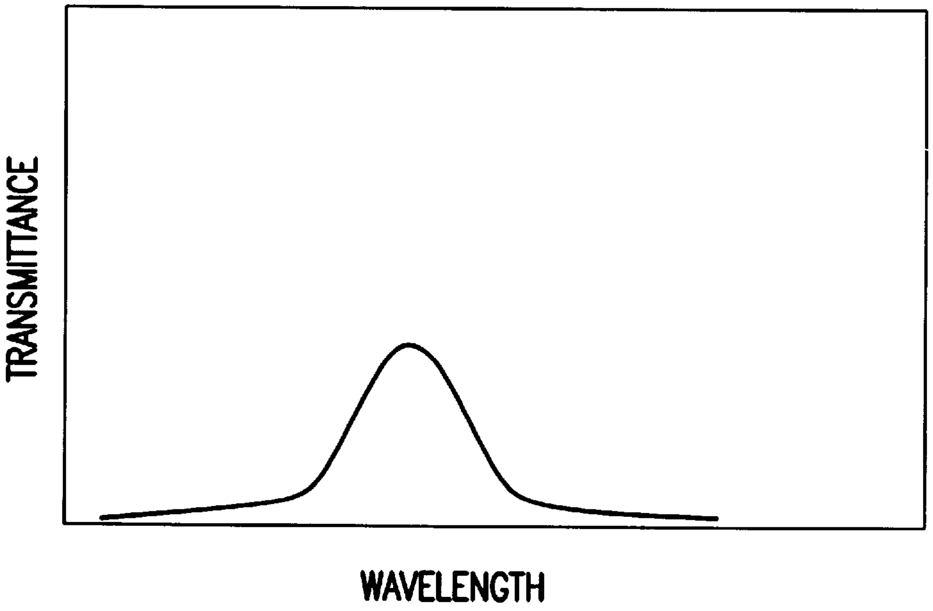
FIG. 7 is a graphical diagram showing a spectral transmission factor of the composite clear color layer of the colored surface coating of FIG. 5 with respect to visible wavelengths.

By means of the constituent layers containing dies different hues, i.e. different spectral transmission factors as shown in FIG. 6, the color clear layer 3D transmits light, having a narrow and sharp distribution of spectral transmission factors, i.e. near a monochromatic radiation, as shown in FIG. 7, toward the color base layer 2. As a consequence, the surface coating SC-D reflects light near a monochromatic radiation.

Figure 8:
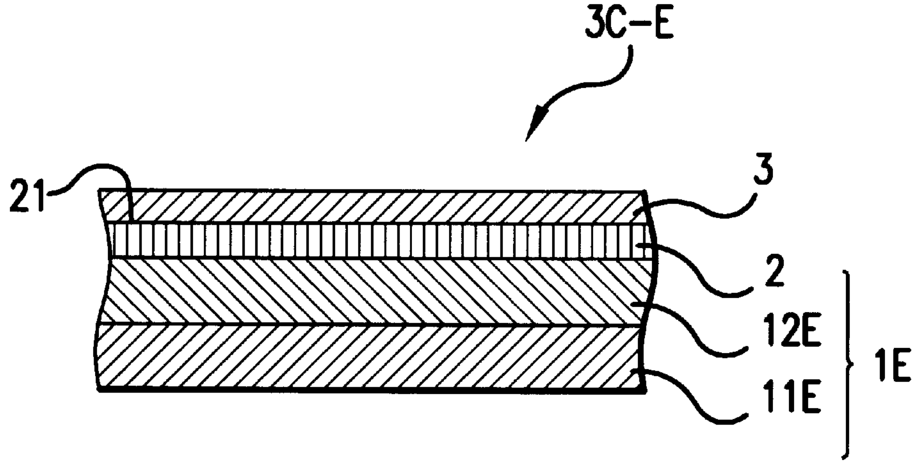
FIG. 8 is a cross-sectional view of a black surface coating in accordance with another preferred embodiment of the present invention.

Referring to FIG. 8, a black surface coating SC-E in accordance with a further preferred embodiment of the present invention is shown. The black surface coating SC-E is comprised of an undercoating 1E, a color base layer 2E, and a color clear layer 3E. The undercoating 1E is comprised of a lower constituent layer 11E formed by electrodeposition on a vehicle body and an upper constituent layer 12E coated over the under constituent layer 11E. Generally, the under constituent layer 11E itself is called an "undercoating or undercoating layer," and the upper constituent layer 12E is called an "interim coating or interim coating layer." The color base layer 2E, coated over the interim coating 1E, contains a black coloring pigment so as to prevent visible light from being transmitted to the undercoating 1E.

The color clear layer 3E contains a proper amount of black coloring dye to transmit visible light. This color clear layer 3E may be formed with either a single layer or multiple layers. The color clear layer 3E is adjusted in both the concentration of dye and in the thickness of layer so as to bear a desirable transmittance. Practically, the color clear layer 3E is coated on the color base layer 2E and then, is baked so as to form an interface 21 with a surface roughness of less than approximately +/−2 μm.

Figure 9:
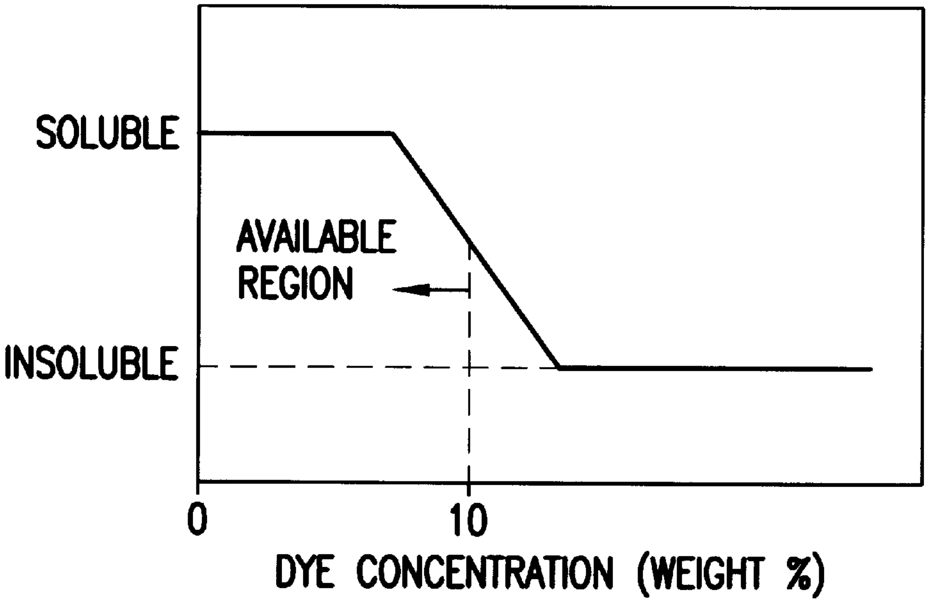
FIG. 9 is a graphical diagram showing the solubility of a dye in a paint resin.

The color base layer 2E bears a lightness $Y_B$ of less than approximately 0.2 and the color clear layer 3E contains approximatley 0.1 to 10 weight % of a black coloring dye and bears a reflectance of less than 0.1 % when letting the reflectance of a barium sulphate (baryta) plate be 100%. This is because, it is considered that 10 weight % of a black coloring dye is a higher limit of sufficient dissolution in a coating resin, as shown in FIG. 9 illustrating an experimental result in which a DBK-02 (produced by Nippon Paint Co., Ltd) was used as a dye to be dissolved in an OTO-571-1 (produced by Nippon Paint Co., Ltd), as a paint resin for the black color clear layer 3E.

Example III (FIG. 8)

Black Surface Coating

Color base layer

- Black pigment contained paint: OTO 520
- Nippon Paint Co., Ltd.
- Mancell hue: 9.3BG
- Paint: Acryl melamine resin paint
- Pigment: Carbon black Color clear layer

Figure 10:
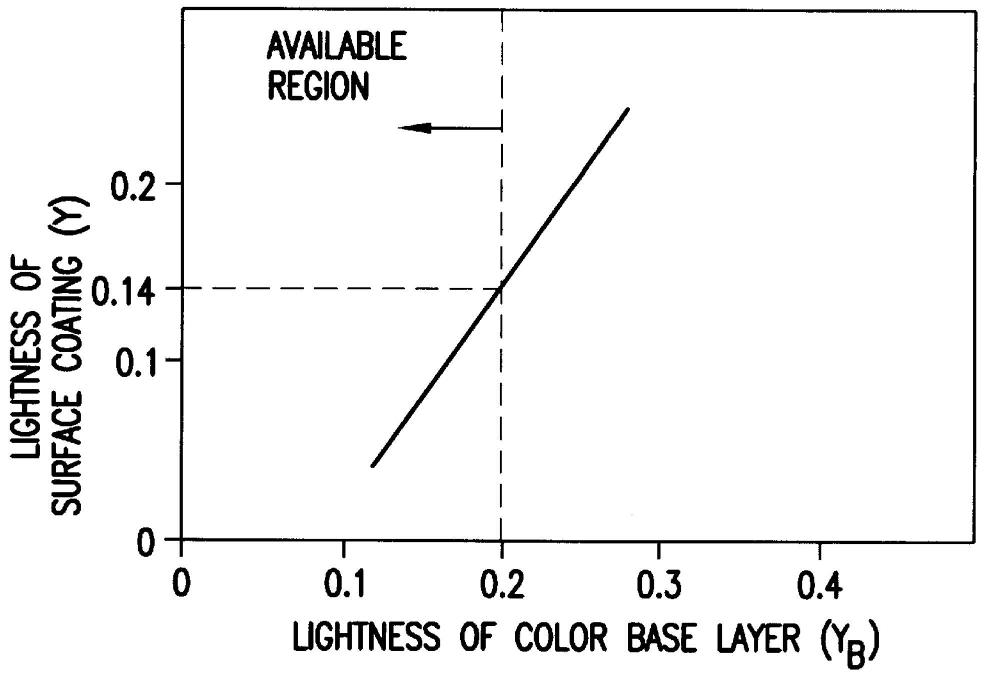
FIG. 10 is a graphical diagram showing a relation of the lightness of a black surface coating relative to that of a black color base layer.

- Dye contained paint
- Paint: OTO571-1
  - Acryl melamine resin
  - ORASOL Black RL (CIBA GEIGY) (which is DBK-02/Nippon Paint)
  - 1:2 chrome complex (Solvent Black 29)
  - Mancell hue: 3B Coating process 1. Apply undercoating and interim coatinq
2. Bake at 140 degrees C. for 30 minutes
3. Apply the color base layer on the vehicle body Dry at a room temp. for 5 minutes
4. Apply the color clear layer
5. Bake at 140 degrees C. for 30 minutes From FIG. 10, which shows a result of experiments conducted to find a relationship between the lightness Y of the black surface coating SC-E, having a color clear layer 3E with a dye concentration of less than 10 weight % and with a maximum layer thickness of 80 μm, and the lightness $Y_B$ of the color base layer 2E, it is revealed that a marginal lightness $Y_B$ of the color base layer 2E, which realizes a practically effective lightness Y of the surface coating SC-E of less than 0.14, is less than 0.2. In these experiments, a DBK-02 (produced by Nippon Paint Co., Ltd) was used as a dye to be dissolved in an OTO-571-1 (produced by Nippon Paint Co., Ltd), as a paint resin for the black color clear layer 3E.

Figure 11:
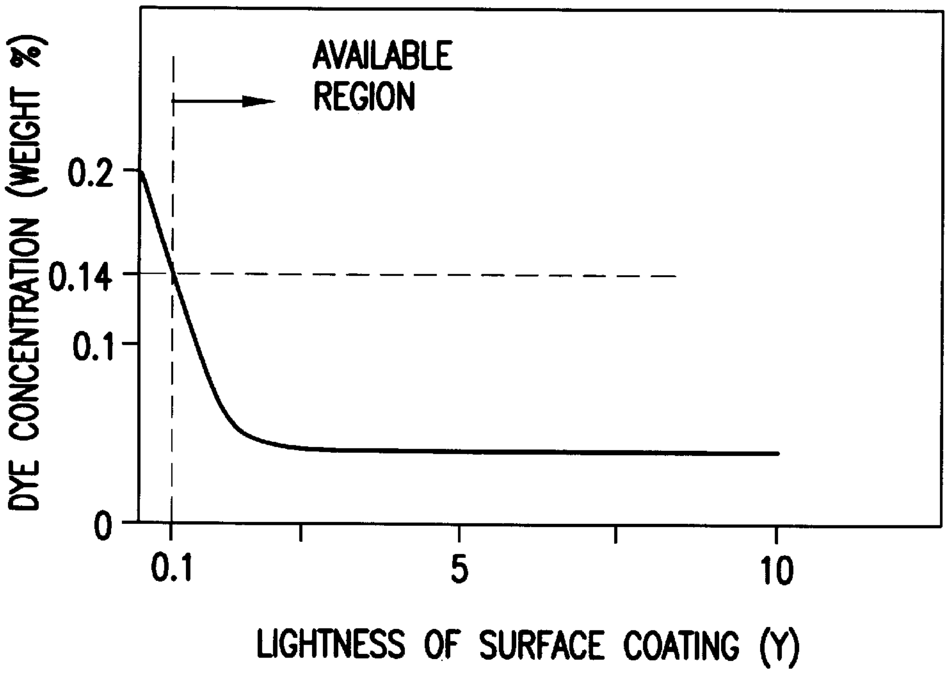
FIG. 11 is a graphical diagram showing a relation of the lightness of a black surface coating relative to the concentration of dye.

FIG. 11 shows the result of a black coloring dye analysis of the surface coating SC-E. It is apparent from FIG. 10 that, with an increase in the concentration in weight % of the black dye in the color clear layer 3E, the surface coating SC-E causes a decline in lightness Y, and that a marginal concentration of the black dye in the color clear layer 3E, which realizes the practically effective lightness Y of the surface coating SC-E of greater than 0.14, is less than 0.1 weight %.

By means of the black dye in the color clear layer 3E, the black surface coating SC-E provides an effective control of scattering caused by the outer surface thereof, the black pigment in the color base layer 2E, and the coating resin and absorbs light, so as to bear a lightness of less than the practical upper limit of 0.14. The surface coating SC-E whose lightness is less than 0.14 grants a feeling of depth of black surface coating.

The surface coating according to the present invention is more vivid and more uniformly colored when each layer is uniform in thickness. Such a surface coating with uniform layers is realized by a coating method of the present invention, which will be hereafter described in detail later.

Figure 12:
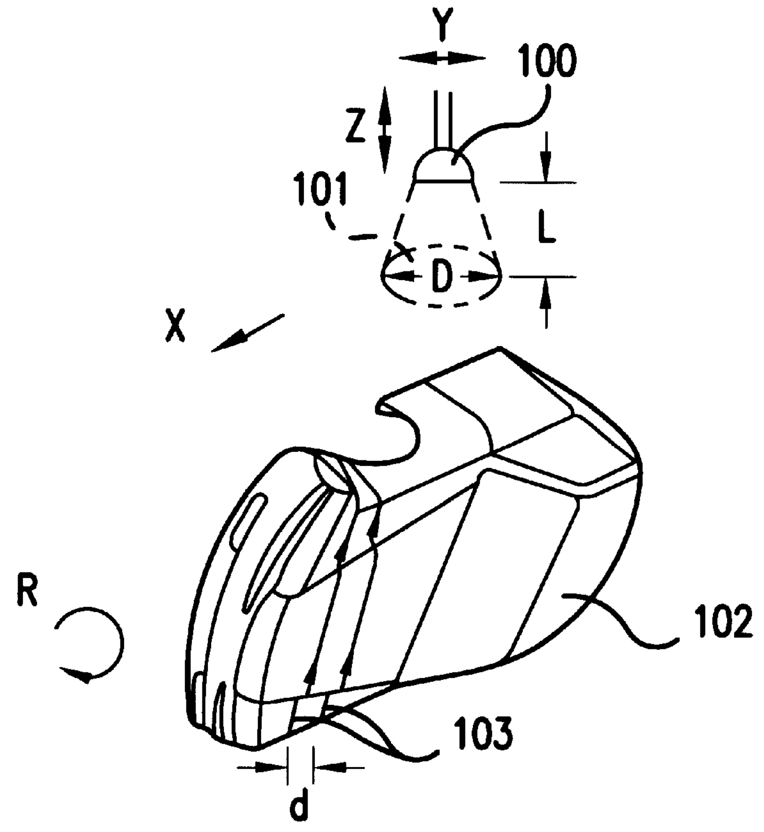
FIG. 12 is a schematic illustration showing a method of applying a surface coating to a vehicle body in accordance with a preferred embodiment of the present invention.
Figure 13:
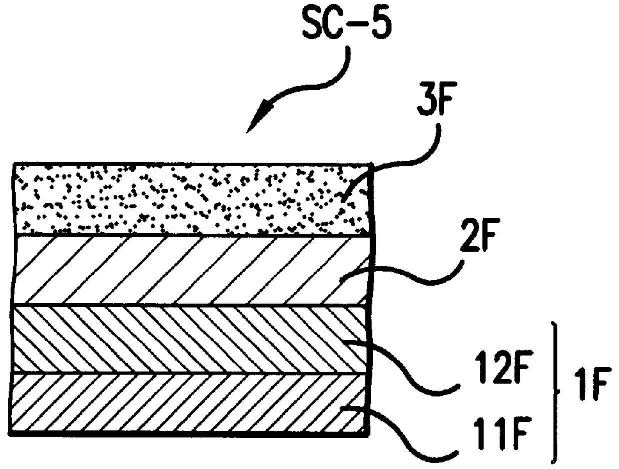
FIG. 13 is a cross-sectional view of a surface coating to be applied by the method of the present invention.

Referring to FIG. 12, a coating method in accordance with a preferred embodiment of the present invention is schematically shown, by which a color clear layer is applied. In this instance, as shown in FIG. 13, a surface coating SC-F is comprised of an undercoating 1F, a color base layer 2F, and a color clear layer 3F. The undercoating 1E is comprised of a lower constituent layer or an undercoating 11F formed by electrodeposition on a subject surface, for instance a vehicle body, and an upper constituent layer or an interim coating 12F coated over the under constituent layer 11F.

A coating apparatus 100, which in turn moves in a direction or Y direction perpendicular to the lengthwise direction or X direction of the vehicle body 102 to be coated and a vertical direction or Z direction, sprays paint having a generally circular spray pattern 101 with a diameter D at a vertical distance L therefrom. The vehicle body 102 moves below the coating apparatus 100 in its lengthwise direction X, perpendicular to both Y and Z directions at a constant linear velocity V. Further, the vehicle body 102 is rotated about an axis in parallel with the X direction as shown by an arrow R. By means of this motion of the vehicle body 102, the coating apparatus 100 draws spiral tracks 103 of the spray pattern on the surface of the vehicle body 102.

Prior to performing coating, control factors are set by adjusting the desired diameter D of a circular spray pattern 101 at a vertical distance L of the coating apparatus 100, and the linear velocity V and angular velocity w of the vehicle body 102 so as to fix pitches or separations d of the spiral tracks 103 of the spray pattern and an angle of inclination of the spiral tracks 103 relative to the Y direction. These control factors are established so that a ratio of the pitch d of spiral tracks 103 to the diameter D of the circular spray pattern 101, which is referred in this specification to as an overlap ratio (d/D), is less than 0.3. All these control factors, including the overlap ratio (d/D, are maintained unchanged throughout coating of the subject vehicle body 102. The critical overlap ratio (d/D) 0.3 was revealed from an experimental a study.

Figure 14:
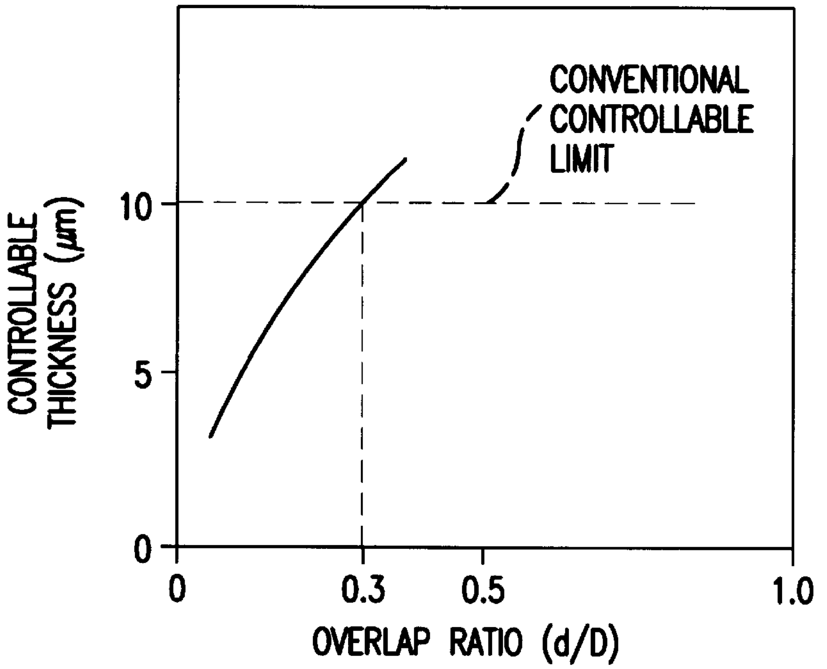
FIG. 14 is a graphical diagram showing a relation of the controllable thickness of a coating layer relative to the ratio of overlap coating.

Referring to FIGS. 13 and 14, a result of the experiments on controllable thickness of color clear layer relative to overlap ratio is shown. The experiments were conducted with use of a dye, DBK-02 (produced by Nippon Paint Co., Ltd.), and a coating resin, OTO-571-1 (produced by Nippon Paint Co., Ltd.). The color clear layer 3F was coated with an average thickness of 50 μm, and the concentration of a coloring dye was 0.5 weight %. The result of the experiments reveals that, with an increase in the overlap ratio (d/D) of the circular spray pattern 101, the color clear layer 3F causes an increase in the controllable thickness and that, however, when the overlap ratio (d/D) is beyond 0.3, the controllable thickness of the color clear layer 3F becomes larger in excess beyond a tolerable error of 10 μm. Accordingly, it is determined that the overlap ratio (d/D) of 0.3 is the critical limit in order to apply a color clear layer uniformly in thickness.

With the coating method of the present invention, it is realized to provide a fine control of thickness of a color clear layer so as to decrease a difference in thickness over the subject surface. This enables to apply even thick coating uniformly without accompanying the lacking in uniformity of color over the subject surface, so as to allow a widened range of lightness of color base layers to be applied. Furthermore, since the coating apparatus 100 is only operated in a wide range of movement, the coating apparatus 100 itself and its associated facilities can be simplified.

In order to ascertain the excellence of a color clear layer of the surface coating SC-F shown in FIG. 14 applied by the coating method of the present invention, experiments were conducted. Used in the experiments are color clear layers which are made of resin, OTO-571-1 (produced by Nippon Paint Co., Ltd.), with an average thickness of 70 μm and contain 0.5 weight % of a coloring dye, DBK-02 (produced by Nippon Paint Co., Ltd.). The result is shown in FIG. 15.

Figure 15:
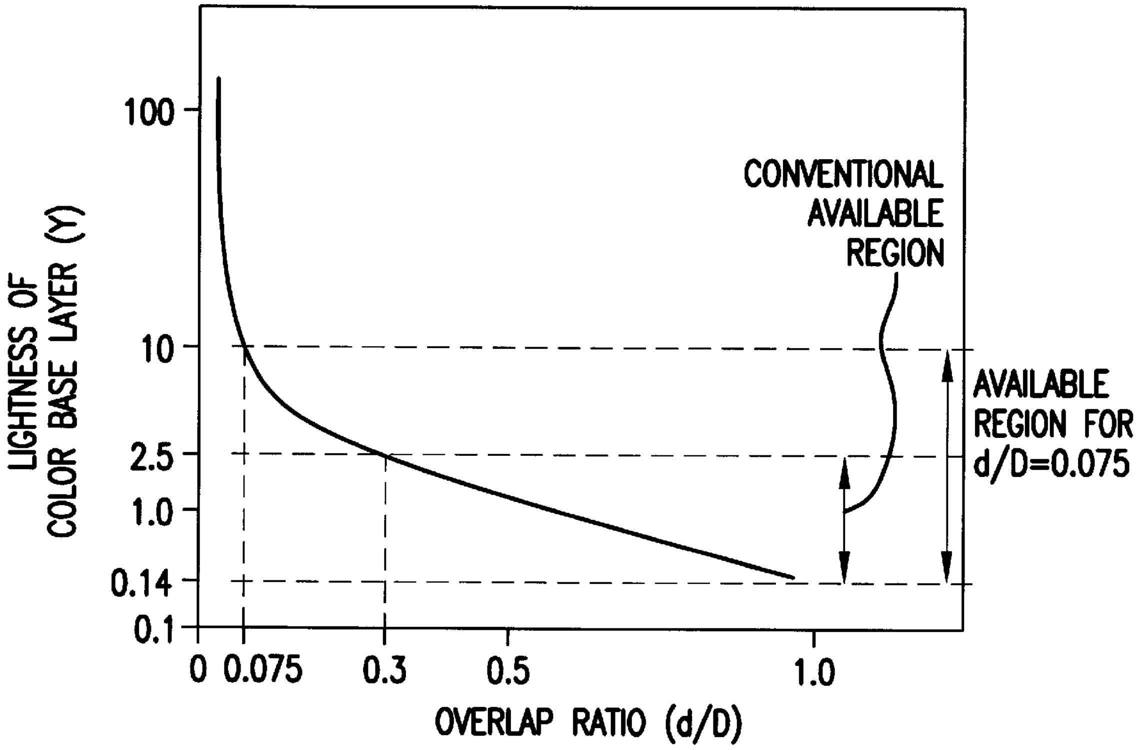
FIG. 15 is a graphical diagram showing a relation of the lightness of a color base layer relative to an overlap ratio.

From the review of FIG. 15, it is revealed that overlap ratios (d/D) over 0.3 are followed by a decline in the marginal color lightness of a color of a color base layer for color uniformity and allow only color base layers whose colors are less in lightness than 2.5 to be available, which are almost black. On the other hand, overlap ratios (d/D) of less than 0.3 allow color base layers of high color lightness, so as to allow a variety of colors to be available to the color base layer. For example, if a color clear layer is coated with an overlap ratio (d/D) of 0.075, the controllable thickness is 3 μm (see FIG. 14), which realizes more easily the color clear layer to be coated uniformly, and the range of the color lightness of color to be available is widened (see FIG. 15), which allows a variety of colors for the color base layer.

It is to be understood that although the present invention has been described in detail with respect to a preferred embodiment thereof, various other embodiments and variants may occur to those skilled in the art. Such other embodiments and variants halls within the scope and spirit of the invention and are intended to be covered by the following claims.

What is claimed is:

1. A laminate including a surface coating and comprising:

a subject surface;

an undercoating layer coated on the subject surface;

a color base layer coated over said undercoating layer, said color base layer containing a coloring material; and a multilayer color clear coating comprising a plurality of color clear layers coated over said color base layer and forming an outermost coating of the surface coating, said multilayer color clear coating containing a coloring dye distributed in said color clear layers at different concentrations varying so as to gradually decrease from top to bottom of said multilayer color clear coating.

2. A laminate as defined in claim 1, wherein said multilayer color clear coating is comprised of at least two constituent layers, each of which contains a coloring dye of a hue within +/−10 from a hue of a coloring material of said color base layer on the 100-division Mansell hue ring, at least one of said constituent layers containing a coloring dye of a hue within +10 from a hue of a coloring material of said color base layer on the 100-division Mansell hue ring, and at least another one of said constituent layers containing a coloring dye of a hue within −10 from a hue of a coloring material of said color base layer on the 100-division Mansell hue ring.

3. A laminate including a surface coating and comprising:

a subject surface;

an undercoating layer coated on the subject surface;

a color base layer coated over said undercoating layer, said color base layer containing a coloring material; and a color clear layer coated over said color base layer and forming an outermost layer of the surface coating, wherein said color clear layer is comprised of at least two constituent layers, each of which contains a coloring dye of a hue within +/−10 from a hue of a coloring material of said color base layer on the 100-division Mansell hue ring, at least one of said constituent layers containing a coloring dye of a hue within +10 from a hue of a coloring material of said color base layer on the 100-division Mansell hue ring, and at least another one of said constituent layers containing a coloring dye of a hue within −10 from a hue of a coloring material of said color base layer on the 100-division Mansell hue ring.

4. A laminate comprised of a surface coating applied to a subject surface, said laminate comprising:

a subject surface;

an undercoating layer coated on the subject surface;

a color base layer coated over said undercoating layer, said color base layer containing a coloring material having a hue; and a color clear layer coated over said color base layer having an outer surface and an inner surface forming an interface with said color base layer, said color clear layer containing a coloring dye of a hue within +/−10 from said hue of said coloring material of said base color layer on the 100-division Mansell hue ring and having an internal reflectance of less than 0.1% when letting an internal reflectance of a barium sulphate plate be 100%.

5. A laminate as defined in claim 4, wherein the outer surface region of said color clear layer contains brilliant particles uniformly dispersed therein.

6. A laminate as defined in claim 4, wherein said color clear layer is comprised of at least two constituent layers, at least one of said constituent layers containing a coloring dye of a hue within +10 from said hue of said coloring material of said color base layer on the 100-division Mansell hue ring, and at least another one of said constituent layers containing a coloring dye of a hue within −10 from said hue of said coloring material of said color base layer on the 100-division Mansell hue ring.

7. A laminate comprised of a surface coating applied to a subject surface, said laminate comprising:

an undercoating layer coated on the subject surface;

a black color base layer coated over said undercoating layer; and a color clear layer coated over said black color base layer, said color clear layer containing 0.1 to 10 weight % of a black dye.

8. A laminate as defined claim 7, wherein said black color base layer has a lightness less than 0.2.

9. A laminate as defined in claim 7, wherein said color clear layer is baked after having been coated on said black color base layer so as to form an interface between said black color base layer and said color clear layer.

10. A laminate as defined in claim 7, wherein said color clear layer has an internal reflectance less than 0.1% when letting an internal reflectance of a barium sulphate plate be 100%.

11. A laminate comprised of a black surface coating applied to a subject surface, said laminate comprising:

a subject surface;

an undercoating formed on said subject surface;

a black color base layer coated on said undercoating; and a color clear layer containing 0.1 to 10 weight % of a black dye having a lightness less than 0.2 coated on said black color base layer.

* * * * *